United States Patent [19]

Hayashi

[11] Patent Number: 5,453,060
[45] Date of Patent: Sep. 26, 1995

[54] POWER TRANSMISSION FOR MECHANICAL PRESS

[75] Inventor: Keiichiro Hayashi, Kamakura, Japan

[73] Assignee: Ishikawajima-Harima Jukogyo Kabushiki Kaisha, Tokyo, Japan

[21] Appl. No.: 337,408

[22] Filed: Nov. 8, 1994

Related U.S. Application Data

[62] Division of Ser. No. 31,883, Mar. 16, 1993, abandoned.

[30] Foreign Application Priority Data

| Mar. 16, 1992 | [JP] | Japan | 4-89259 |
| Oct. 23, 1992 | [JP] | Japan | 4-307946 |
| Nov. 4, 1992 | [JP] | Japan | 4-317962 |
| Dec. 25, 1992 | [JP] | Japan | 4-358010 |
| Jan. 29, 1993 | [JP] | Japan | 5-32395 |

[51] Int. Cl.⁶ ................................. F16H 1/46
[52] U.S. Cl. ................................. 475/5; 475/9
[58] Field of Search ......................... 475/5, 9

[56] References Cited

U.S. PATENT DOCUMENTS 2,969,696  1/1961  Fraga ............................ 475/9

Primary Examiner—Dirk Wright
Attorney, Agent, or Firm—Oblon, Spivak, McClelland, Maier, & Neustadt

[57] ABSTRACT

A power transmission shaft which transmits rotational energy of a flywheel is divided into a first shaft section adjacent to the flywheel and a second shaft section adjacent to a power take-off gear. A planetary gearing is arranged between the shaft sections and is adapted to be driven by a servo motor. A power take-off gear is mounted on an output section of the planetary gearing so as to transmit the power to drives. The servo motor controls the rotation of the output section of the planetary gearing to vary the rotation of the power take-off gear so that the action velocity of the slide or the like can be freely controlled and press working for different kinds of materials can be carried out.

1 Claim, 9 Drawing Sheets

POWER TRANSMISSION FOR MECHANICAL PRESS

This is a Division of application Serial No. 08/031,883 filed on Mar. 16, 1993 now allowed.

BACKGROUND OF THE INVENTION

The present invention relates to a power transmission for a mechanical press for transmitting driving force of a main motor to a slide drive, a work conveyance drive or the like.

In some conventional mechanical press, a die-supporting slide is driven by a slide drive to press a work. In time with the pressing operation, a work conveyance drive is driven to convey a work. Thus, works are continuously formed into products.

FIG. 1 shows an example of a power transmission for transmitting driving force to such slide and work conveyance drives. A main motor 1 is driven to rotate a flywheel 2 and store rotational energy in the flywheel 2. A clutch 3 is then clutched or engaged to the flywheel 2 to transmit the rotational energy stored in the flywheel 2, as driving force, to a power transmission shaft 4. The driving force is taken by a power take-off gear 5 on the shaft 4 and is transmitted through a junction gear 6 to a pinion 7 coaxial with the gear 6. The pinion 7 is rotated to drive a slide drive 8 so that a slide 9 which supports a die is driven to carry out a pressing operation. At the same time, the rotation of the junction gear 6 is also transmitted through a bevel gearing 10 or the like to a work conveyance drive 12. Reference numeral 11 denotes a brake for the power transmission shaft 4.

In the above-mentioned conventional power transmission, for structural reasons, movements of the drives 8 and 12 can be controlled only by selective engagement and disengagement of the clutch 3 and volocity-control of the flywheel 2. Therefore, for example, action velocity of the slide 9 cannot be controlled during a stroke of movement of the slide 9; pressing working cannot be carried out with the slide 9 being temporally stopped at its bottom dead point of movement. As a result, pressing working for different kinds of materials is considerably limited.

In the conventional power transmission, the slide drive 8 is actuated by engaging the clutch 3 to the flywheel 2 which is rotating; this causes mechanical shock and big noise. Moreover, structurally the clutch 3 requires connection pads such as friction inserts, which are consumables; this requires a great number of pads being prepared for exchange and periodic maintenance has to be carry out for checking whether the pads being used are to be exchanged or not.

In view of the above, a primary object of the present invention is to provide a power transmission for a mechanical press which can control action velocity of a slide or the like to non-limitatively carry out press working for different kinds of materials and which employs no clutch, which is a cause of mechanical shock and requires consumables to be exchanged, to thereby carry out press working with no maintenance for consumables and with lower cost.

To attain the above object, in a power transmission wherein rotational energy stored in a flywheel is taken through a power transmission shaft by a power take-off gear and is transmitted to a drive, the present invention resides in that the power transmission shaft is divided into first and second shaft sections adjacent to the flywheel and the power take-off gear, respectively, a planetary gearing being arranged between the shaft sections and adapted to be driven by a servo motor, the power take-off gear being mounted on an output section of said planetary gearing.

In another aspect of the invention, a planetary gearing is arranged between the shaft sections and has at its portion a variable torque brake which is controlled by a control unit.

In a further aspect of the invention, a planetary gearing is arranged between the shaft sections and is driven by a servo motor. The power take-off gear and a brake is arranged at an output section of the planetary gearing. A on-off coupling which may be a gear coupling is arranged between the flywheel and the first shaft section.

A differential gear may be arranged to return part of output from the planetary gearing to an input section thereof and may be connected to a servo motor.

The slide drive may be provided with a load cell which detects any overload acting of the slide to transmit a signal from the load cell to the servo motor.

When the planetary gearing is arranged between the shaft sections as mentioned above, the rotational energy of the flywheel is transmitted through the first shaft section to the planetary gearing and is taken by the power take-off gear. By controlling rotation of a part of the planetary gearing, rotational velocity of the power take-off gear can be varied so that action velocity of the drive can be freely or arbitrarily controlled. Thus, the action velocity of the slide or the like can be controlled during a stroke of movement thereof.

When the variable torque brake is arranged, in place of servo motor, at a part of the planetary gearing, the rotational velocity of a part of the planetary gearing can be controlled by the torque brake, which varies the rotational velocity of the power take-off gear so that action velocity of the drive can be freely controlled.

When the power take-off gear and the brake are provided at the output section of the planetary gearing driven by the servo motor and the rotational velocity of the servo motor is set to a calculated value with the drive being braked to stop, the rotational velocity of the first shaft section of the power transmission shaft can be made equal to that of the flywheel. This makes it possible to employ a connector such as gear coupling between flywheel and the power transmission shaft which requires no consumables such as connection pads. To vary the rotational velocity of the power take-off gear can be attained by controlling the rotation of the output section of the planetary gearing by means of the servo motor so that action velocity of the drive can be freely controlled.

When the differential gear is provided to return part of output of the planetary gearing to an input section thereof and is connected to the servo motor, braking force required for the servo motor can be minimized.

When any overload is detected by the load cell, the servo motor may be tripped or driven at a predetermined rotational velocity to nullify overload.

DETAILED DESCRIPTION OF THE PREFERRED EMBODIMENTS

Preferred embodiments of the present invention will be described in conjunction with the drawings.

Figure 1:
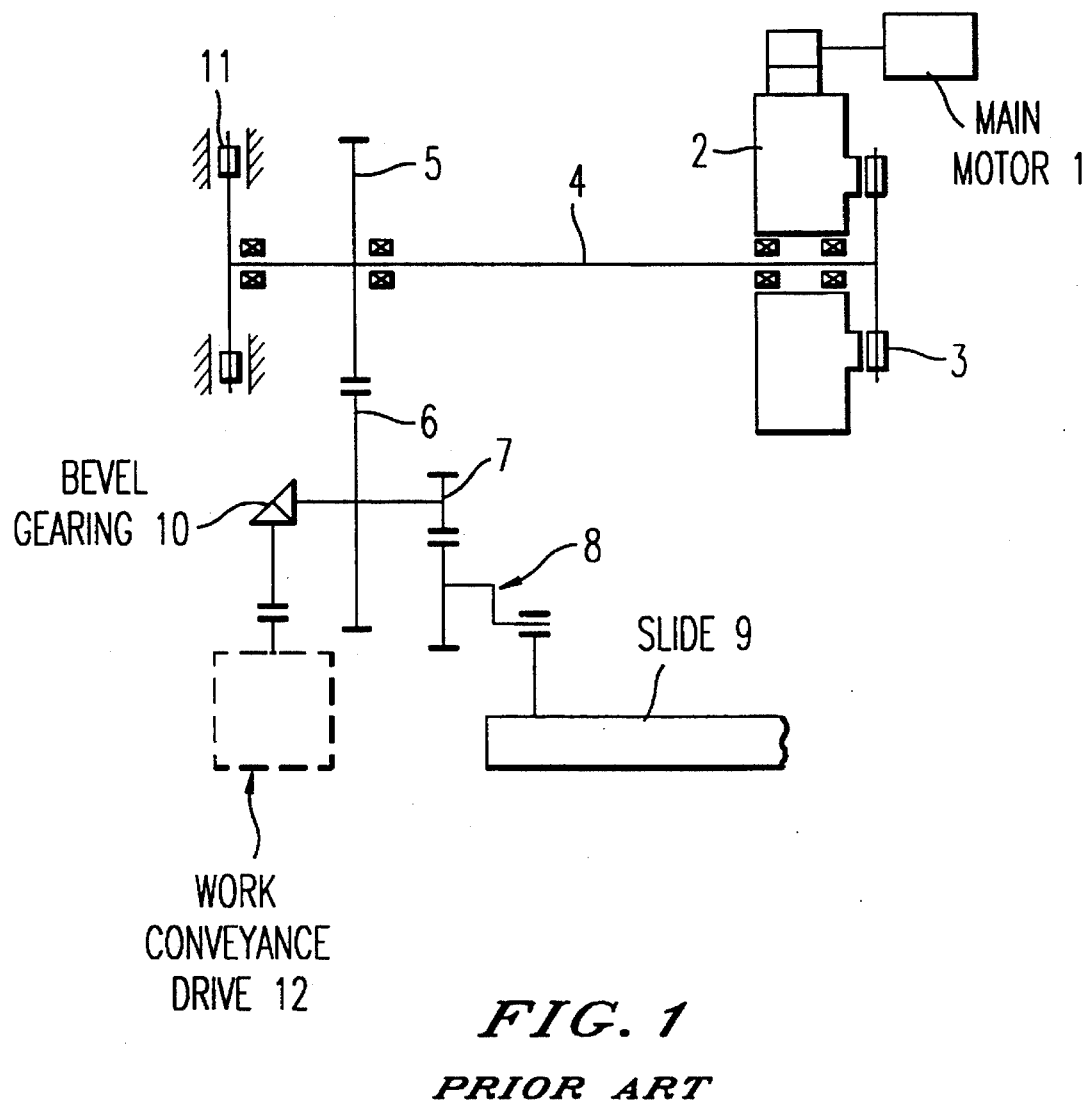
FIG. 1 is a schematic view showing a conventional power transmission for a mechanical press.
Figure 2:
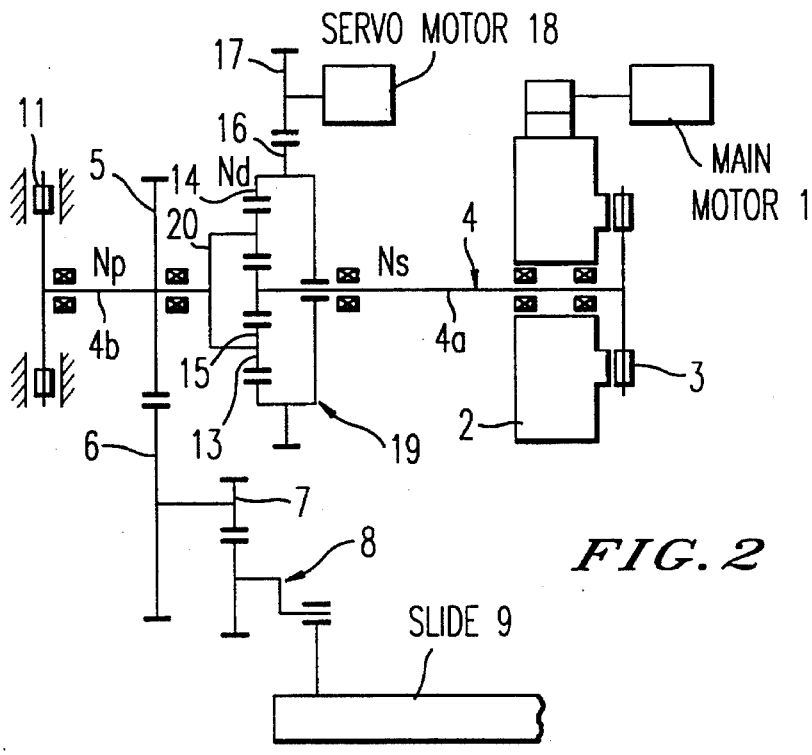
FIGS. 2 to 13 are schematic views showing first to twelfth embodiments of a power transmission for a mechanical press according to the present invention, respectively.

FIG. 2 shows a first embodiment of the present invention and is directed to a case where rotational energy of a flywheel is transmitted as driving force to a slide. In a power transmission for a mechanical press similar in structure to the conventional power transmission shown in FIG. 1, a power transmission shaft 4 is divided at a position between the flywheel 2 and the power take-off gear 5 into first and second shaft sections adjacent to the flywheel 2 and the gear 5, respectively. Arranged between the shaft sections 4a and 4b is a planetary gearing 19 which comprises a sun gear 15, a planetary gear 13 and an internal-tooth ring gear 14 in mesh with one another in the order named. The sun gear 15 is connected to the shaft section 4a and a planetary carrier 20 of the planetary gear 13 is connected to the shaft section 4b as power take-off shaft. A power take-off gear 5 is mounted on the second shaft section 4b so that the rotational energy of the flywheel 2 is transmitted from the first shaft section 4a through the planetary gearing 19 to the power take-off gear 5 where the power to be given to the slide drive 8 is taken. The ring gear 14 has at its outer periphery an external-tooth ring gear 16 attached thereto which is in mesh with a pinion 17. The pinion 17 is mounted on a shaft of a servo motor 18 such as AC servo motor. As a result, the servo motor 18 is driven to control rotation of the carrier 20 of the planetary gear 13 as output section of the planetary gearing 19 so that rotation of the power take-off gear 5 on the second shaft section 4b in relation to the first shaft section 4a as input section can be varied to freely control action velocity of a slide 9 vertically displaced by a slide drive 8. In FIG. 2, the parts similar to those in FIG. 1 has the same reference numerals as those in FIG. 1.

When the clutch 3 is engaged to the flywheel 2 being rotated by the main motor 1, the rotational energy of the flywheel 2 is taken through the clutch 3 by the first shaft section 4a and is transmitted through the planetary gearing 19 to the second shaft section 4b so that the power to be given to the slide drive 8 is taken by the power take-off gear 5 on the shaft section 4b. In this case, rotational velocity of the planetary carrier 20 of the planetary gear 13 as output section of the planetary gearing 19 can be controlled by the servo motor 18 so that rotational velocity of the power take-off gear 5 can be freely controlled. Therefore, movement of the slide 9 vertically displaced by the drive 8 can be freely controlled.

The following equations applies:

$$N_d = N_p - \frac{Z_1}{Z_3} \times (N_s - N_p) \quad (1)$$

$$Z_2 = \frac{Z_3 - Z_1}{2} \quad (2)$$

where $N_s$ is a rotational velocity of the first shaft section 4a;

$N_p$ is a rotational velocity of the second shaft section 4b;

$N_d$ is a rotational velocity of the internal-tooth ring gear 14 of the planetary gearing 19 driven by the servo motor 18;

$Z_1$ is a number of teeth on the sun gear 15;

$Z_2$ is a number of teeth on the planetary gear 13; and $Z_3$ is a number of teeth on the ring gear 14.

Therefore, based on the equation (1) above, in a normal operation where $N_p=N_s$, the rotational velocity of the internal-tooth ring gear 14 is to be controlled by the servo motor 18 such that $N_d=N_s$ is satisfied.

When the servo motor 18 is stopped ($N_d=0$), the following is derived from the equation (1):

$$N_p = \frac{Z_1}{Z_1 + Z_3} \times N_s$$

Under such condition, the driving force is taken by the power take-off gear 5 and is transmitted to the slide drive 8.

When the press working is to be stopped, i.e., when the slide 9 is to be stopped ($N_p=0$), based on the equation (1), the rotational velocity of the ring gear 14 is to be controlled by the servo motor 18 such that the following is satisfied:

$$N_d = -\frac{Z_1}{Z_3} \times N_s$$

Thus, according to the present invention, the rotational velocity of the planetary gearing 19 is controlled by the servo motor 18 so that the action velocity of the slide 9 can be freely controlled during a stroke of movement of the slide 9. Therefore, holding of pressing state for a certain time interval after the press working may be carried out, which is especially effective in press working of material made of aluminum, and press working for different kinds of materials can be carried out non-limitatively.

In FIG. 2, the internal-tooth ring gear 14 may be in mesh with a second planetary gear arranged coaxially and integral with the planetary gear 13. In this case, the following applies:

$$N_d = \left(1 + \frac{Z_1 \cdot Z_4}{Z_3 \cdot Z_2}\right) \times N_p - \frac{Z_1 \cdot Z_4}{Z_3 \cdot Z_2} \times N_s$$

where $Z_4$ is a number of teeth of the second planetary gear.

Figure 3:
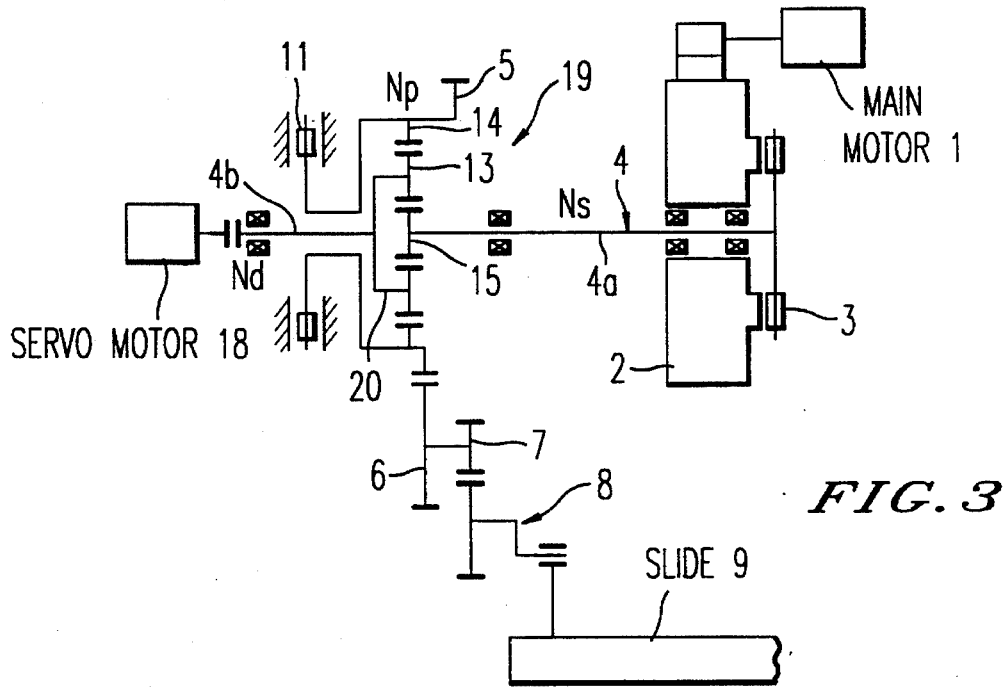

FIG. 3 shows a second embodiment of the present invention which is similar in structure to the first embodiment shown in FIG. 1 except that the power take-off gear 5 is attached to an outer periphery of an inner-tooth ring gear 14 as output section of the planetary gearing 19, a carrier 21 for the ring gear 14 being connected through a hollow shaft 22 to the brake 11, the second shaft section 4b in connection with the planetary carrier 20 of a planetary gear 13 being adapted to be driven by the servo motor 18.

In the second embodiment, the following equation applies:

$$N_d = \frac{N_p}{1 + \frac{Z_1}{Z_3}} \times \frac{N_s}{1 + \frac{Z_3}{Z_1}} \quad (3)$$

where $N_s$ is a rotational velocity of the first shaft section 4a;

$N_d$ is a rotational velocity of the second shaft section 4b driven by the servo motor 18;

$N_p$ is a rotational velocity of the internal-tooth ring gear 14 of the gearing 19;

$Z_1$ is a number of teeth on the sun gear 15;

$Z_2$ is a number of teeth on the planetary gear 13; and $Z_3$ is a number of teeth on the ring gear 14.

Therefore, based on the equation (3), in a normal operation where $N_p=N_s$, the rotational velocity of the planetary carrier 20 of the planetary gear 13 is to be controlled through the second shaft section 4b by the servo motor 18 such that the equation $N_d=N_s$ is satisfied. When the servo motor 18 is stopped ($N_d$=0), the following is derived from the equation (3), $$N_p = -\frac{Z_1}{Z_3} \times N_s$$

and under such condition the driving force is taken by the power takeoff gear 5. When the press working is to be stopped ($N_p$=0), based on the equation (3), the rotational velocity of the carrier 20 of the planetary gear 13 is to be controlled by the servo motor 18 such that the following equation is satisfied:

$$N_d = \frac{Z_1}{Z_1 + Z_3} \times N_s$$

In FIG. 3, the internal-tooth ring gear 14 may be in mesh with a second planetary gear arranged coaxial and integral with the planetary gear 13; alternatively, the power take-off gear 5 may be mounted on the hollow shaft 22. Then, the following equation applies:

$$N_d = N_p \times \frac{1}{1+\frac{Z_1 \cdot Z_4}{Z_2 \cdot Z_3}} + N_s \times \frac{1}{1+\frac{Z_2 \cdot Z_3}{Z_1 \cdot Z_4}}$$

Figure 4:
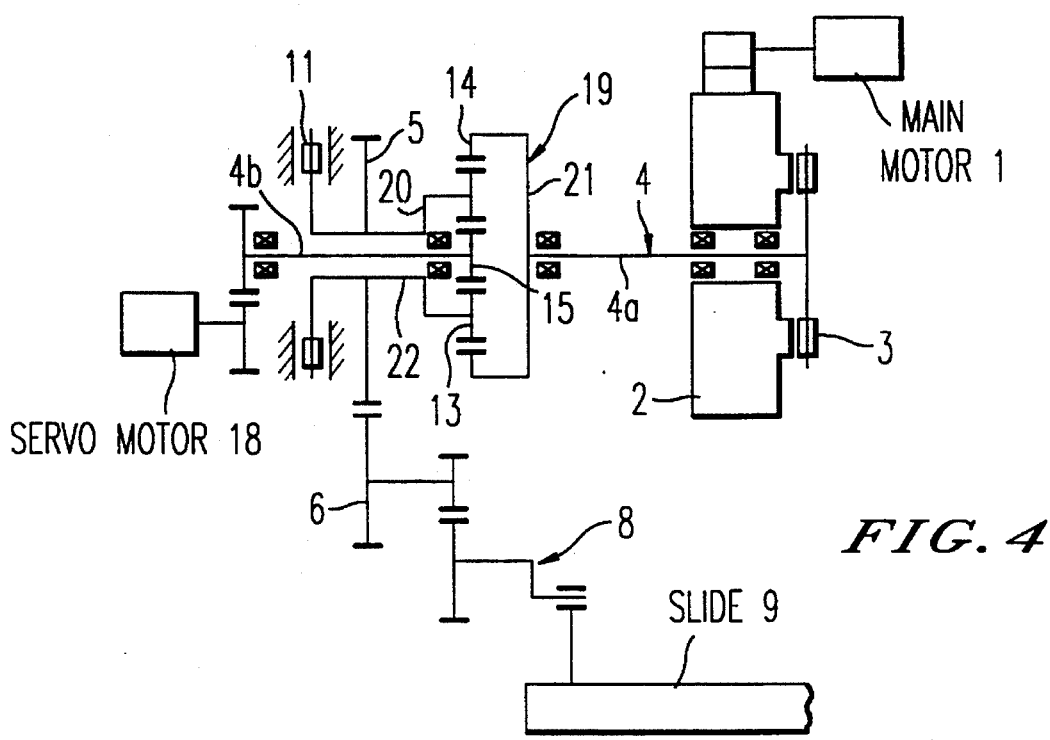

FIG. 4 shows a third embodiment of the present invention which is similar in structure to the second embodiment shown in FIG. 3 except that the first shaft section 4a is connected to the carrier 21 of the internal-tooth ring gear 14, the second shaft section 4b being connected to the sun gear 15, the power take-off gear 5 and the brake 11 being mounted through the hollow shaft 22 on the planetary carrier 20 of the planetary gear 13, the planetary gear 13 acting as output section.

In the third embodiment shown in FIG. 4, rotation of the planetary gearing 19 is controlled by the servo motor 18 so that the action velocity of the slide 9 can be freely controlled just like the first and second embodiments respectively shown in FIGS. 2 and 3.

Also in FIG. 4, the internal-tooth ring gear 14 may be in mesh with a second planetary gear arranged coaxial and integral with the planetary gear 13.

Figure 5:
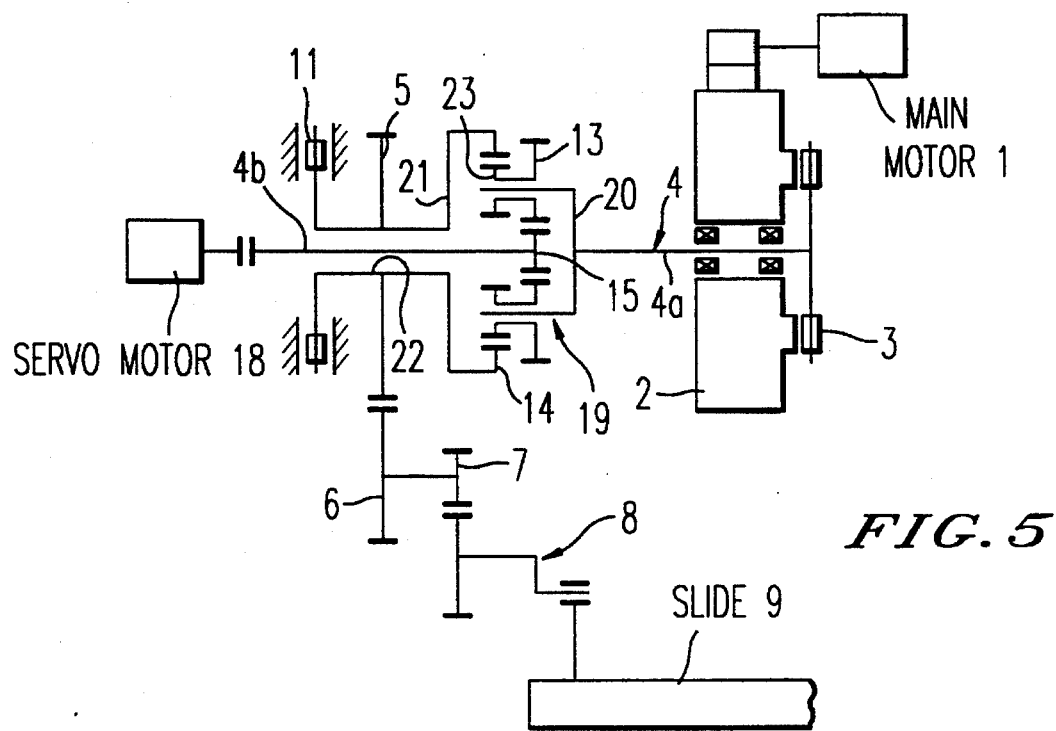

FIG. 5 shows a fourth embodiment of the present invention which is similar in structure to the third embodiment shown in FIG. 4 except that the planetary gear 13 is a first planetary gear, a second planetary gear 23 being coaxial and integral with the first planetary gear 13, the carrier 20 for the planetary gears 13 and 23 being connected to the first shaft section 4a, the second planetary gear 23 being in mesh with the internal-tooth ring gear 14, the carrier 21 of the ring gear 14 being mounted on the hollow shaft 22, the ring gear 14 acting as output section.

Figure 6:
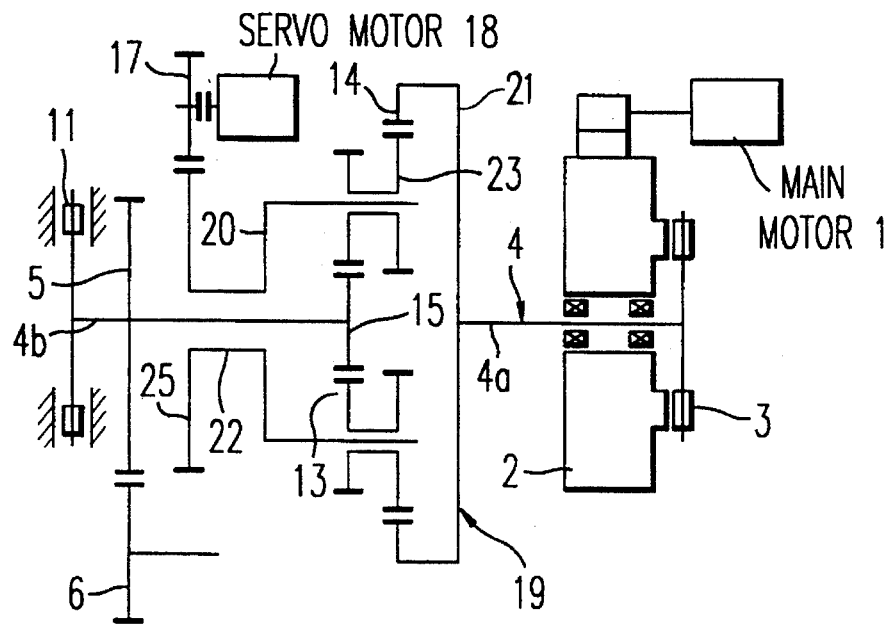

FIG. 6 shows a fifth embodiment of the present invention which is similar in structure to the first embodiment shown in FIG. 2 except that the planetary gear 13 is a first planetary gear, the second planetary gear 23 being arranged coaxial and integral with the first planetary gear 13, the internal-tooth ring gear 14 being in mesh with the second planetary gear 23 and the carrier 21 of the ring gear 14 being connected to the first shaft section 4a, the sun gear 15 being connected to the second shaft section 4b, the carrier 20 of the planetary gears 13 and 23 being connected to the hollow shaft 22 on the shaft section 4b, the pinion 17 driven by the servo motor 18 being in mesh with a gear 25 on the hollow shaft 22, the sun gear 15 acting as output section.

Figure 7:
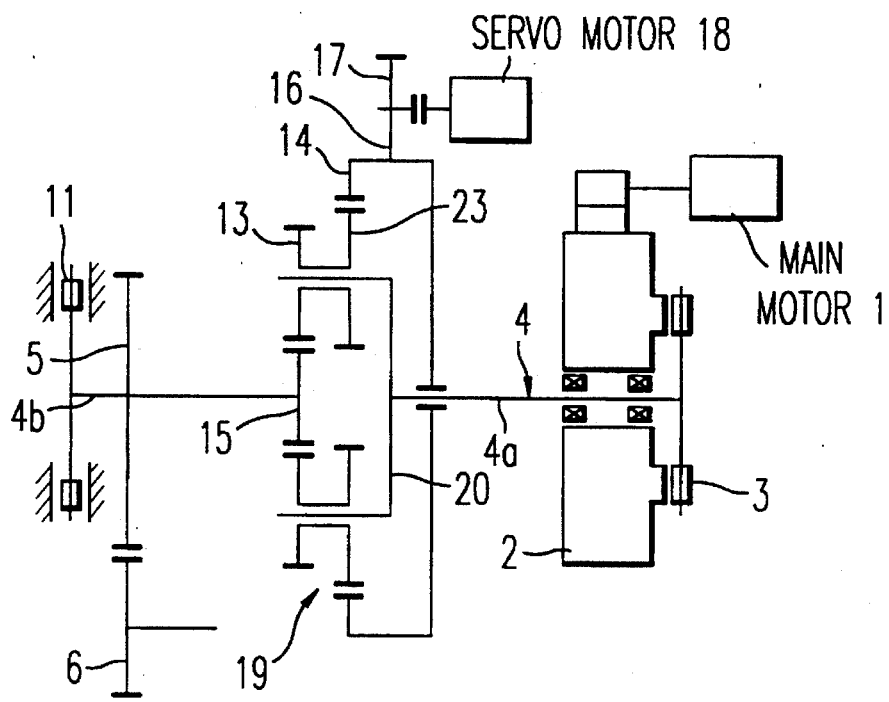

FIG. 7 is a sixth embodiment of the present invention which is similar in structure to the first embodiment shown in FIG. 2 except that the planetary gear 13 is a first planetary gear, a second planetary gear 23 being arranged coaxial and integral with the first planetary gear 13, the internal-tooth ring gear 14 being in mesh with said second planetary gear 23, the sun gear 15 being connected to the second shaft section 4b, the sun gear 15 acting as output section.

In the fourth to sixth embodiment shown in FIGS. 5 to 7, respectively, the similar effects and advantages as those in the first to third embodiments shown in FIGS. 2 to 4 will be obtained.

FIGS. 8 to 13 show modifications of the first to sixth embodiments shown in FIGS. 2 to 7, respectively, where a planetary gearing 19' having a second sun gear 24 is used in place of the planetary gearing 19 having the internal-tooth ring gear 14.

Figure 8:
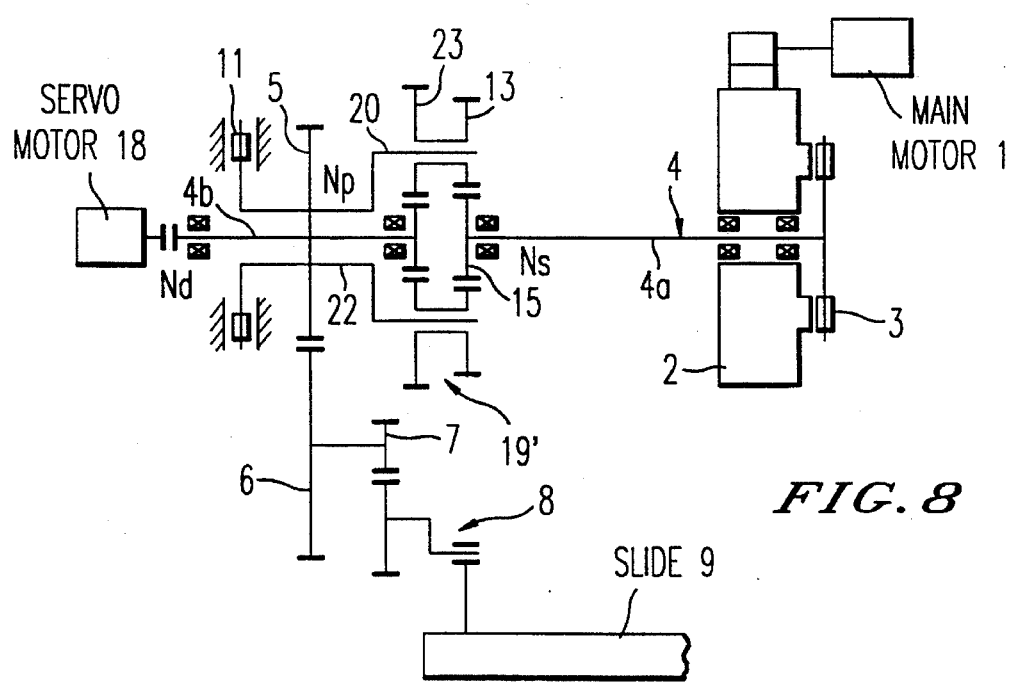

More specifically, FIG. 8 shows a seventh embodiment which is a modification and development of the first embodiment shown in FIG. 2. Arranged between the shaft sections 4a and 4b is the planetary gearing 19' having the first and second sun gears 15 and 24 and the first and second planetary gears 13 and 23 coaxial and integral with each other and respectively in mesh with the gears 15 and 24, the first sun gear 15 being connected to the first shaft section 4a, the second sun gear 24 being connected to an end of the shaft section 4b, the carrier 20 of the planetary gears 13 and 23 being connected to the hollow shaft 22 on the second shaft section 4b, the power take-off gear 5 and the brake 11 being mounted on the hollow shaft 22, the other end of the shaft section 4b being connected to the servo motor 18.

In the above, the following applies:

$$N_d = \frac{1}{1-\frac{Z_1 \cdot Z_4}{Z_2 \cdot Z_5}} \times N_p + \frac{Z_1 \cdot Z_4}{Z_2 \cdot Z_5} \times N_s$$

where $N_s$ is a rotational velocity of the first shaft section 4a;

$N_d$ is a rotational velocity of the second shaft section 4b by the servo motor 18;

$N_p$ is a rotational velocity of the hollow shaft 22 which is a common rotational velocity of the planetary gears 13 and 23 as output section;

$Z_1$ is a number of teeth of the first sun gear 15;

$Z_2$ is a number of teeth of the first planetary gear 13;

$Z_4$ is a number of teeth of the second planetary gear 23; and $Z_5$ is a number of teeth of the second sun gear 24.

Therefore, the action velocity of the slide 9 can be freely controlled by controlling the rotational velocity of the servo motor 18.

Figure 9:
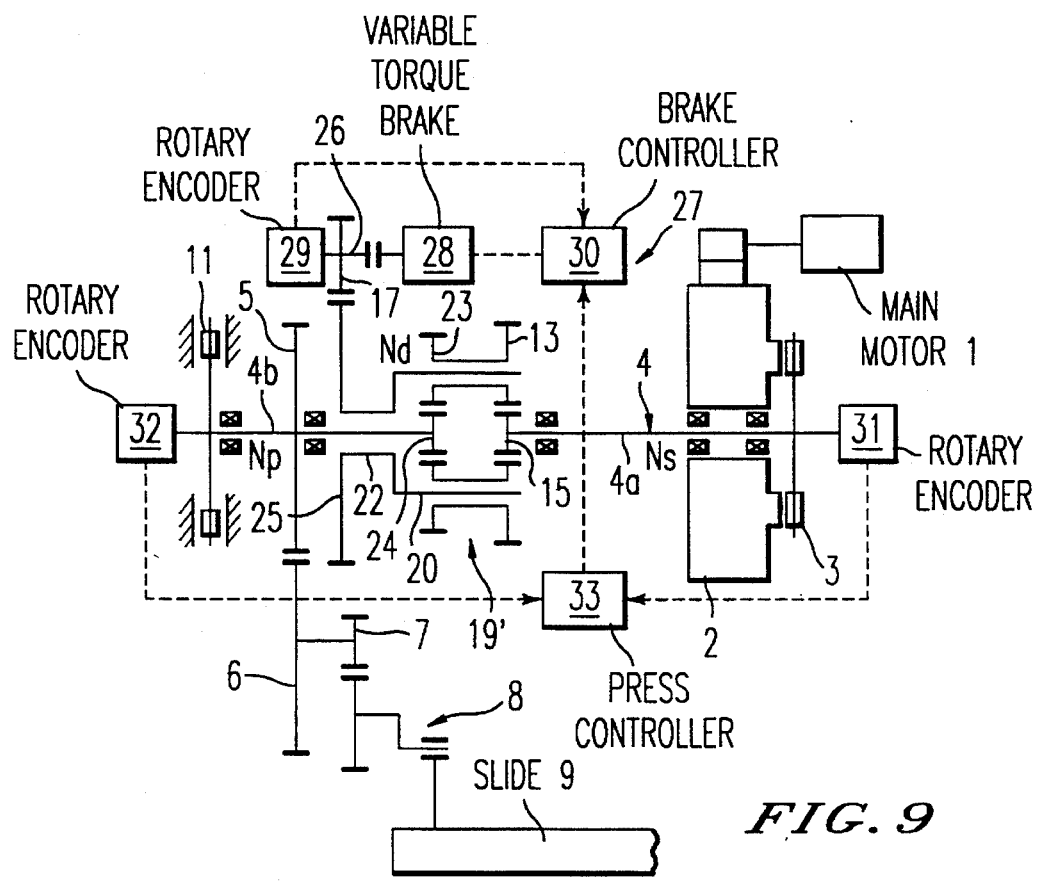

FIG. 9 shows an eighth embodiment of the present invention which is a modification and development of the second embodiment shown in FIG. 3. Arranged between the first and second shaft sections 4a and 4b is the planetary gearing 19' having the first and second sun gears 15 and 24 and the coaxial and integral planetary gears 13 and 23 in mesh with the sun gears 15 and 24, the sun gears 15 and 24 being respectively connected to the shaft sections 4a and 4b, the rotational energy of the flywheel 2 being transmitted from the first shaft section 4a through the planetary gearing 19' to the power take-off gear 5, the power to be given to the slide drive 8 being taken by the gear 5, the gear 25 being mounted through the hollow shaft 22 on the carrier 20 of the planetary gears 13 and 23, a shaft 26 of the pinion 17 in mesh with the gear 25 being connected to a variable torque brake 28 which is adapted to be actuated by instructions from a control unit 27. The rotational velocity of the gear 5 can be varied through the sun gear 24 as output section by controlling the common rotational velocity of the planetary gears 13 and 23 through actuation of the variable torque brake 28 to thereby freely control the action velocity of the slide 9 vertically displaced by the slide drive 8.

The control unit 27 comprises a brake controller 30, which is adapted to receive a feedback signal from a rotary encoder 29 as speedmeter on the shaft 26 of the pinion 17 and which sends a drive signal to the variable torque brake 28, and a press controller 33 which sends an action signal to the brake controller 30 on the basis of signals from rotary encoders 31 and 32 as speedmeters respectively on the shaft sections 4a and 4b.

In the eighth embodiment shown in FIG. 9, when the clutch 3 is engaged to the rotating flywheel 2 driven by the main motor 1, the rotational energy of the flywheel 2 is taken through the clutch 3 by the first shaft section 4a and is transmitted through the planetary gearing 19' to the second shaft section 4b, the power to be given to the slide drive 8 being taken by the power take-off gear 5 on the second shaft section 4b. In this case, the common rotational velocity of the planetary gears 13 and 23 of the planetary gearing 19' can be controlled by the variable torque brake 28 so that the rotational velocity of the power take-off gear 5 can be freely varied. Therefore, the movement of the slide 9 vertically displaced by the slide drive 8 can be freely controlled during a stroke of movement of the slide 9. Based on the rotational velocity of the first shaft section 4a detected by the rotary encoder 31, the press controller 33 sends instructions to the brake controller 30 which in turn sends instructions to actuate the variable torque brake 28 to thereby control the common rotational velocity of the planetary gears 13 and 23 of the planetary gearing 19' and vary the rotational velocity of the power take-off gear 5 through the sun gear 24 as output section. The rotational velocities of the pinion 17 and power take-off gear 5 detected respectively by the rotary encoders 29 and 32 are respectively fedback to the brake controller 30 and press controller 33.

In the above, the following equation applies:

$$N_d = N_p \times \frac{1}{1 - \frac{Z_1 \cdot Z_4}{Z_2 \cdot Z_5}} + N_s \times \frac{1}{1 - \frac{Z_2 \cdot Z_5}{Z_1 \cdot Z_4}}$$

where $N_s$ is a rotational velocity of the first shaft section 4a;

$N_p$ is a rotational velocity of the second shaft section 4b;

$N_d$ is a common rotational velocity of the planetary gears 13 and 23, i.e. a rotational velocity of the hollow shaft 22;

$Z_1$ is a number of teeth of the first sun gear 15;

$Z_2$ is a number of teeth of the first planetary gear 13;

$Z_4$ is a number of teeth of the second planetary gear 23; and $Z_5$ is a number of teeth of the second sun gear 24.

Therefore, based on the above equation, in a normal operation, the equation $N_p = N_s$ will be satisfied by controlling the common rotational velocity of the planetary gears 13 and 23 by the variable torque brake 28 such that $N_d = N_s$.

When the brake 28 is completely acted ($N_d = 0$), based on the above equation, $$N_p = N_s \times \frac{Z_1 \cdot Z_4}{Z_2 \cdot Z_5}$$

and under such condition the power is taken by the power take-off gear 5 and is transmitted to the slide drive 8.

When the press working is to be stopped, i.e., when the slide 9 is to be stopped, the relation $N_p = 0$ is obtained by controlling the common rotational velocity of the planetary gears 13 and 23 by means of the variable torque brake 28 such that $$N_d = N_s \times \frac{1}{1 - \frac{Z_2 \cdot Z_5}{Z_1 \cdot Z_4}}$$

Thus, in the eighth embodiment shown in FIG. 9, the rotational of the planetary gearing 19' is controlled by the variable torque brake 28 so that the action velocity of the slide 9 can be freely controlled in a stroke of movement of the slide 9. As a result, pressing state can be held for a certain time interval after press working, which is especially effective for press working of material made of aluminum: after press working, pressing parts can be returned to their waiting or inoperative position; and press working can be effected non-limitatively for different kinds of materials. Moreover, it is advantageous in efficiency.

In FIG. 9, the servo motor 18 may be used in place of the variable torque brake 28.

Figure 10:
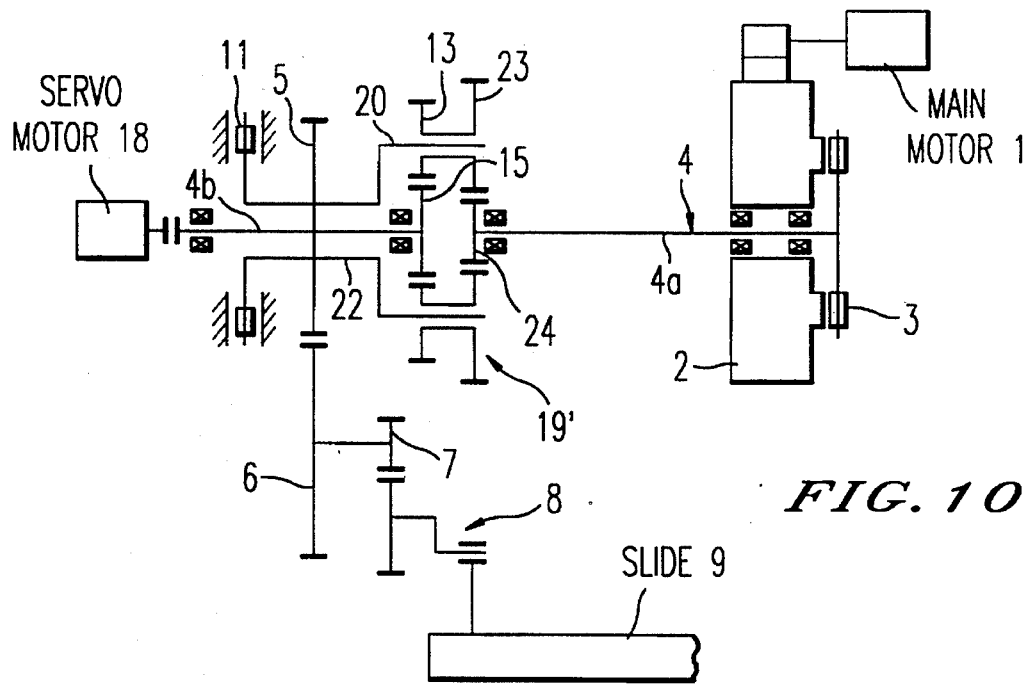

FIG. 10 shows a ninth embodiment of the present invention which is a modification of the third embodiment shown in FIG. 4 and which is similar in structure to the seventh embodiment shown in FIG. 8 except that positions of the first and second sun gears 15 and 24 are reverse and positions of the first and second planetary gears 13 and 23 are reverse. More specifically, the first sun gear 15 in mesh with the first planetary gear 13 is connected to the second shaft section 4b while the second sun gear 24 in mesh with the second planetary gear 23 is connected to the first shaft section 4a.

The ninth embodiment shown in FIG. 10 also has the same effects and advantages as those obtained in the seventh embodiment shown in FIG. 8.

Figure 11:
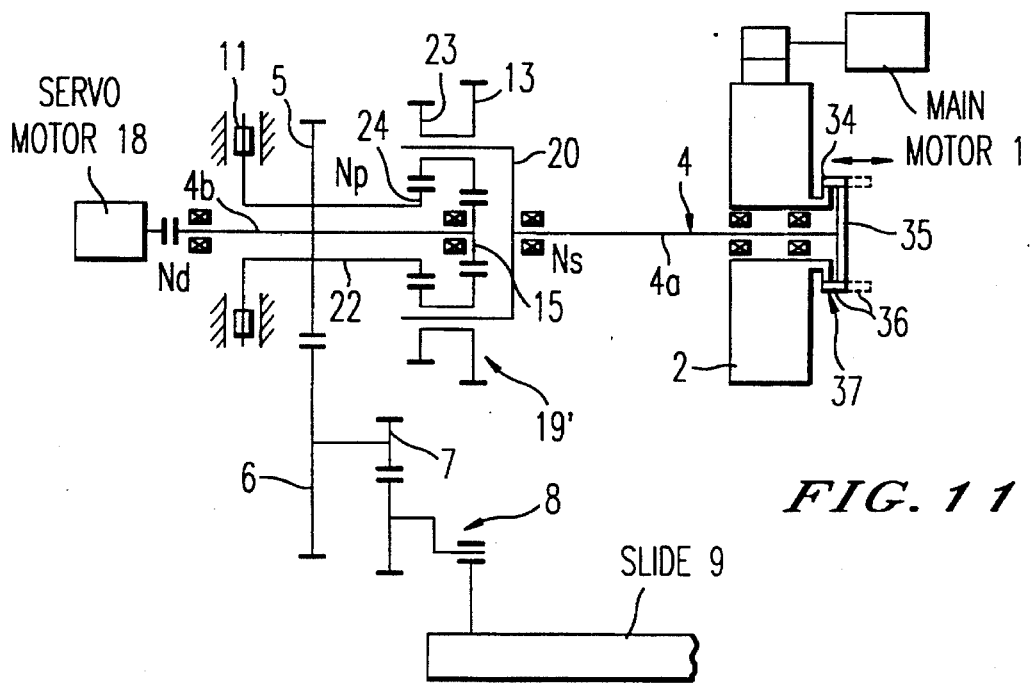

FIG. 11 shows a tenth embodiment of the present invention which is a modification and development of the fourth embodiment shown in FIG. 5. In order to transmit the rotational energy of the flywheel 2 to the power transmission shaft 4, arranged between the flywheel 2 and the first shaft section 4a is a gear coupling comprising a ring gear 34 contiguous with a side edge of the flywheel 2, a gear 35 opposed to the gear 34 and attached to the first shaft section 4a and an internal-tooth ring 36 adapted to be axially moved between outer peripheries of the gears 34 and 35 for connection and disconnection of the gears 34 and 35 with each other, so that the rotation of the flywheel 2 is transmitted through the gear coupling 37 to the power transmission shaft 4.

The planetary gearing 19' is arranged between the shaft sections 4a and 4b. The carrier 20 of the planetary gears 13 and 23 is connected to the first shaft section 4a. The first sun gear 15 is connected to one end of the second shaft section 4b. The power take-off gear 5 is mounted through the hollow shaft 22 on the second sun gear 24. The servo motor 18 is connected to the other end of the second shaft section 4b. As a result, the rotation of the power take-off gear 5 can be controlled through the planetary gearing 19' by the servo motor 18. The hollow shaft 22 is provided with the brake 11.

Now, with the flywheel 2 being separated from the first shaft section 4a by the gear coupling 37, the main motor 1 is driven at a predetermined rotational speed while rotation of the second sun gear 24 as output section of the planetary gearing 19' is stopped through the hollow shaft 22 by the brake 11. When the servo motor 18 is driven under such conditions, the planetary gears 13 and 23 are rotated in unison around the sun gears 15 and 24 and the first shaft section 4a is rotated. The rotational velocity of the servo motor 18 is controlled such that the first shaft section 4a is rotated at the same rotational velocity as that of the flywheel 2. In this case, the gears 34 and 35 can be interconnected without difficulty since they are rotated at the same rotational velocity. Upon start of press working, the brake 11 is disengaged and the servo motor 18 is controllingly driven so that the first sun gear 15 is rotated to control controls the rotation of the planetary gears 13 and 23 and the rotation transmitted from the second sun gear 24 through the hollow shaft 22 to the power take-off gear 5 can be freely varied.

In the above, the following equation applies:

$$N_d = \frac{Z_2 \cdot Z_5}{Z_1 \cdot Z_4} \times N_p - \left( \frac{Z_2 \cdot Z_5}{Z_1 \cdot Z_4} - 1 \right) \times N_s$$

where $N_s$ is a rotational velocity of the first shaft section 4a;

$N_d$ is a rotational velocity of the second shaft section 4b;

$N_p$ is a rotational velocity of the second sun gear 24 as output section of the planetary gearing 19';

$Z_1$ is a number of teeth of the first sun gear 15:

$Z_2$ is a number of teeth of the first planetary gear 13;

$Z_4$ is a number of teeth of the second planetary gear 23; and $Z_5$ is a number of teeth of the second sun gear 24.

Therefore, the movement of the slide 9 vertically displaced by the slide drive 8 can be freely controlled by controlling $N_d$. More specifically, upon start of the operation, the flywheel 2 is rotated to have a predetermined velocity $N_s$ under the conditions that the gear coupling 37 is off and the brake 11 is on. Then, the servo motor 18 is rotated with a value $N_d$ which satisfies the equation $N_p=0$. In this case, the press working is being stopped because of the brake 11 being on and the first shaft section 4a is rotated at the same velocity as $N_s$. Since the flywheel 2 is of the same velocity with that of the first shaft section 4a, the gear coupling 37 can be actuated to interconnect the gears 34 and 35 with no mechanical shock in this state. Thus, preparation of the operation is completed. Upon starting of the press working, the brake 11 is made off and at the same time the servo motor 18 is actuated to make $N_d$ toward a predetermined value $N_p$. Thus, the slide 9 is smoothly started to move.

In this manner, in the tenth embodiment shown in FIG. 11, driving and stop of the slide 9 upon starting of the press working can be made by the operation of the servo motor 18 and the brake 11 so that the flywheel 2 can be always being connected to the first shaft section 4a. As a result, the gear coupling 37 which requires no connections pads can be used between the flywheel 2 and the power transmission shaft 4.

Figure 12:
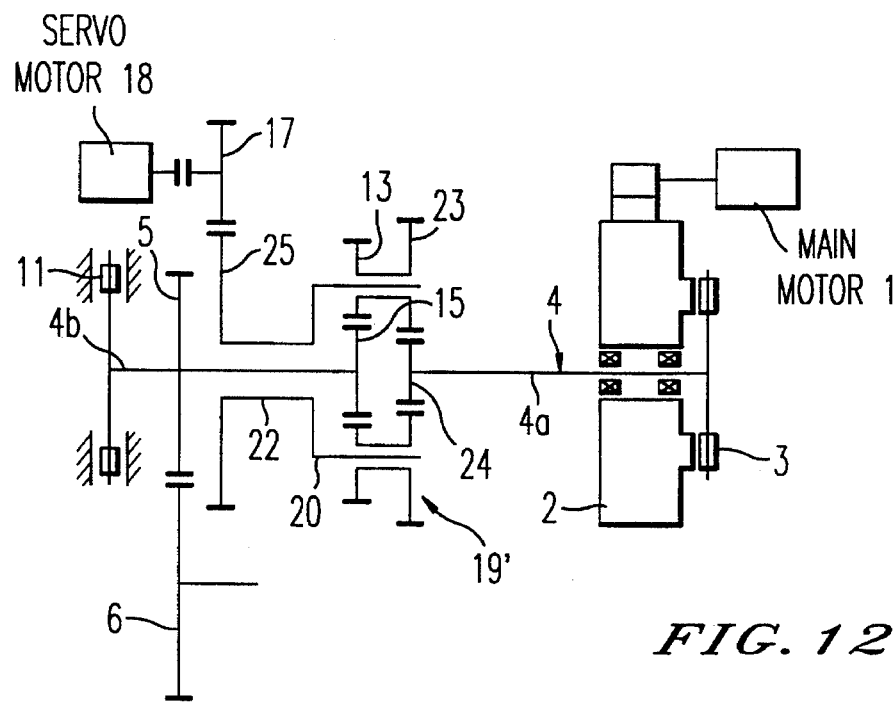
Figure 13:
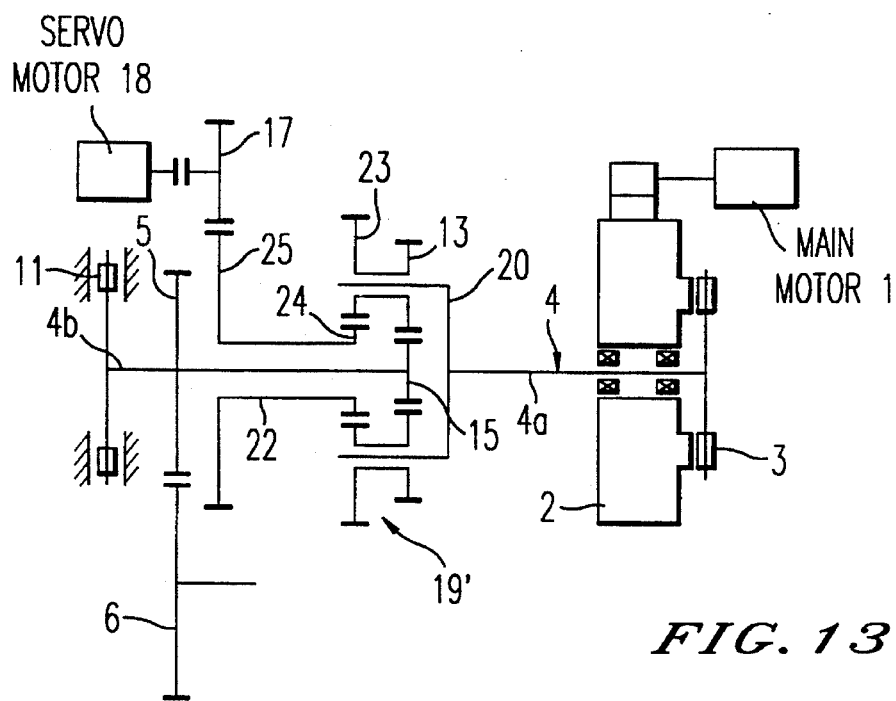

FIGS. 12 and 13 respectively show eleventh and twelfth embodiments of the present invention which are modifications of the fifth and sixth embodiments shown in FIGS. 6 and 7, respectively. The eleventh embodiment shown in FIG. 12 is similar in structure to the eighth embodiment shown in FIG. 9 embodiment except that the first sun gear 15 is connected to the second shaft section 4b and the second sun gear 24 is connected to the first shaft section 4a. In the twelfth embodiment shown in FIG. 13, the first sun gear 15 is connected to the second shaft section 4b, the second sun gear 24 being mounted on the hollow shaft 22, the carrier 20 of the planetary gears 13 and 23 being connected to the first shaft section 4a.

The eleventh and twelfth embodiments respectively shown in FIGS. 12 and 13 also have the similar effects and advantages to those in the remaining embodiments.

Here, with reference to the above-mentioned first to twelfth embodiments respectively shown in FIGS. 1 to 13, combinations of the respective gears of the planetary gearing with the shafts of the servo motor 18, flywheel 2 and power take-off gear 5 are as shown in Table 1 below. In Table 1, R denotes the outernal-tooth ring gear 14: P, at least one of the planetary gears 13 and 23; $S_1$, the first sun gear; and $S_2$, the second sun gear 24.

TABLE 1

|  | shaft of servo motor | shaft of flywheel | shaft of power take-off gear |
|---|---|---|---|
| 1st embodiment | R | $S_1$ | P |
| 2nd embodiment | P | $S_1$ | R |
| 3rd embodiment | $S_1$ | R | P |
| 4th embodiment | $S_1$ | P | R |
| 5th embodiment | P | R | $S_1$ |
| 6th embodiment | R | P | $S_1$ |
| 7th embodiment | $S_2$ | $S_1$ | P |
| 8th embodiment | P | $S_1$ | $S_2$ |
| 9th embodiment | $S_1$ | S2 | P |
| 10th embodiment | $S_1$ | P | $S_2$ |
| 11th embodiment | P | $S_2$ | $S_1$ |
| 12th embodiment | $S_2$ | P | $S_1$ |

Figure 14:
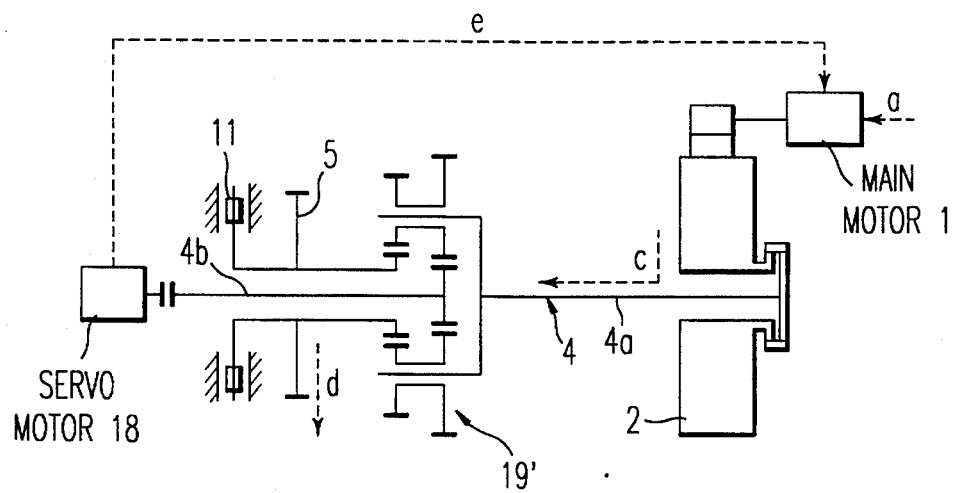
FIG. 14 is a schematic view showing flows of electric and mechanical powers in the tenth embodiment shown in FIG. 11.

FIG. 14 shows flows of electric power by arrows a, b and e and flows of mechanical power by arrows c and d during the operation in the tenth embodiment shown in FIG. 11. More specifically, for example, in low-velocity press working, all of the energy from the flywheel 2 is not consumed and most thereof is made into electric power and is returned to power source so that the braking force of the servo motor 18 is greater. In this case, suppose that power (arrow a) of the main motor 1 be 1 kw. Then, power (arrow b) of the servo motor 18 is 0 kw and the power (arrow c) from the flywheel 2 to the planetary gearing 19' is added with powers of and back to the main motor 1 and amounts to 77 kw. Let the power (arrow d) taken by the power take-off gear 5 and transmitted to the slide be 1 kw, then the power returned to the power source by the servo motor 18 is 76 kw and the servo motor 18 will require power of 76 kw. When the slide is to be stopped at its lower dead point, the power for d is 0 kw so that the power for e is 77 kw (maximum). In the press working with deceleration to ½, power distribution is 46.2 kw for a, 0 kw for b, 77 kw for c, 46.2 kw for d and 30.8 kw for e so that the servo motor 18 requires the power of 30.8 kw. Furthermore, in operation with no deceleration (i.e., normal press working with no acceleration and deceleration), the power distribution is 77 kw for a, 15.4 kw for b, 77 kw for c and 92.4 kw for d (which is sum of the power from b with the power from c).

In view of the above respective operational modes, in the lower-velocity press working, the electric power of 76 kw as maximum is returned from the servo valve 18 to the power source so that the servo motor 18 is braked with larger torque corresponding to such maximum, which requires the servo motor to be of larger-sized.

Figure 15:
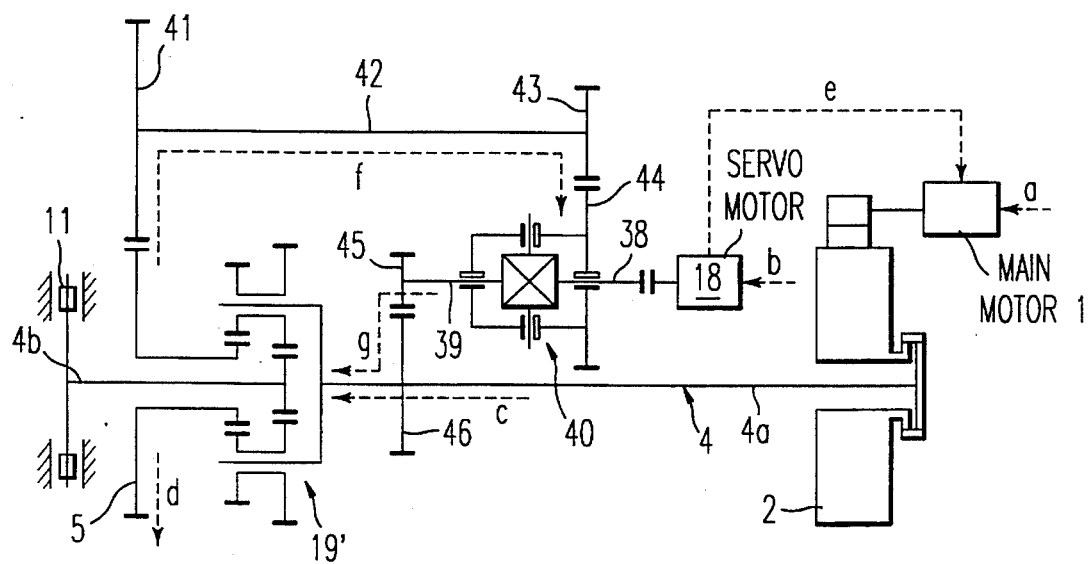
FIGS. 15 and 16 are schematic views showing thirteenth and fourteenth embodiments of the present invention, respectively.

Then, a fourteenth embodiment shown in FIG. 15 is devised out to minimize the braking force required for the servo motor 18. In this embodiment, energy from the flywheel 2 is returned as mechanical energy unlike the tenth embodiment where it is returned as electric energy. In order to return the mechanical power taken from the output section of the planetary gearing 19' to the input section, arranged adjacent to the first shaft section 4a as input side of the planetary gearing 19' is a differential gear 40 with its side gear shafts 38 and 39 being in parallel with the first shaft section 4a. A power transmission gear 41 is in mesh with the power take-off gear 5. A drive gear 43 is mounted on a shaft 42 on which the power transmission shaft 41 is also mounted. The drive gear 43 is in mesh with a carriage gear 44 of the differential gear 40. One of the side gears, i.e., the side gear 38 is connected to the servo motor 18 while a pinion 45 is mounted on the other side gear 39. A gear 46 is arranged midway of the first shaft section 4a and is in mesh with the pinion 45.

In the fourteenth embodiment shown in FIG. 15, part of mechanical power taken at the output side of the planetary gearing 19' by the power take-off gear 5 is returned through the transmission gear 41, the shaft 42, the drive gear 43, the differential gear 40, the pinion 45, the gear 46 and the first shaft section 4a to the planetary gearing 19' so that the servo motor 18 may be of minimum power for velocity control by optimumly selecting deceleration ratio.

More specifically, in the above, in lower-velocity press working, let the power distribution be 0 kw for a and b, 46.2 kw for c and 1 kw for d. Then, the power of 76 kw mechanically returned from the power take-off gear 5 to the differential gear 40 along arrow f is distributed by the differential gear 40 so that mechanical power of 30.8 kw is returned along arrow g to the planetary gearing 19' and electric power of 45.2 kw is returned from the servo motor 18 along arrow e to the power source. Therefore, sum of the powers of c and g is fed to the planetary gearing 19', the power of 1 kw being consumed for d, the remaining power of 76 kw being mechanical returned to the differential gear 40. This means that, for the servo motor 18 which requires 76 kw in the twelfth embodiment shown in FIG. 13, power of 45.2 kw will suffice. In the press working with deceleration to ½, let the power distribution be 46.2 kw for a, 0 kw for b, 46.2 kw for c and 46.2 kw for d. Then, the power of 30.8 kw for f mechanically returned from the planetary gearing 19' to the differential gear 40 is circulated through g so that the power for e is 0 kw and the power of the servo motor becomes zero. In an operation with no deceleration, the power of 46.2 kw for a is transmitted through c to d and the power of 46.2 kw for b is distributed at the differential gear 40 into 15.4 kw for f (in the direction reverse to the above-mentioned case) and 30.8 kw for g and summed with the value for c to become 92.4 kw for d. Therefore, the power for e is 0 kw.

As is clear from the above, even in view of all the operation modes, in contrast to the case of the thirteenth embodiment shown in FIG. 14 where the maximum power required is 77 kw, the fourteenth embodiment shown in FIG. 15 will do with maximum power of 46.2 kw and the servo motor 18 with the capacity of 60% will suffice.

With respect to the fourteenth embodiment shown in FIG. 15, description has been made such that the input and output sections of the differential gear 40 and the connection to the servo motor 18 are the carriage gear 44, the side gear 39 and the side gear 38, respectively. However, these relationship may be freely interchangeable.

Figure 16:
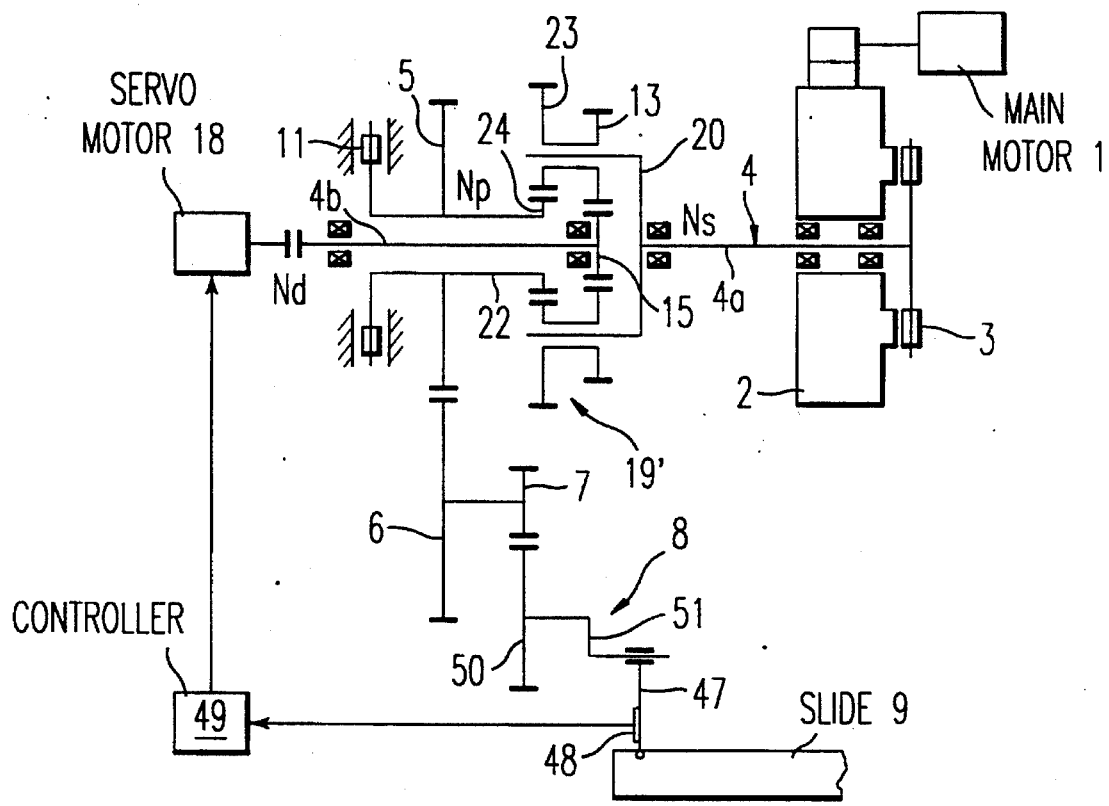

FIG. 16 shows a fifteenth embodiment of the present invention which is substantially similar in structure to the tenth embodiment shown in FIG. 11 further comprising a load cell 48 on a crank lever 47 of the slide drive 8 for detecting reaction load acting on the slide 9. The load cell 48 is connected to a controller 49. When any load detected by the load cell 48 is overload, instructions are sent from the controller 49 to the servo motor 18 to trip the motor 18. Reference numeral 50 denotes a main gear for the slide drive 8; and 51, a crank arm.

According to this embodiment, in the condition that press action is given at a predetermined velocity by the servo motor 18 to the slide 9, a signal representative of the load detected by the load cell 48 is fed to the controller 49: when it is judged to be overload, then instructions are fed from the controller 49 to the servo motor 18 so as to trip the motor 18.

Since the servo motor 18 is tripped, any overload will not act on the die and/or slide drive 8, thereby protecting the machinery.

In the above, combination of the planetary gearing 19', the serve motor 18 and the load cell 48 which protects the machinery are non-hydraulic systems. In comparison with the prior art having hydraulic means as countermeasure to any overload, the present invention is much simplified in structure and is much facilitated in maintenance.

It is to be understood that the present invention is not limited to the embodiments described above and that various modification may be made within the true spirit of the present invention. For example, the gear coupling 37 of the tenth embodiment shown in FIG. 11 may be also applied in the other embodiments. In the above, description has been made on control of the slide drive 8 only; to transmit the power to the work conveyance drive 12 (see FIG. 1) may be made on the basis of the output result of the power transmission according to the present invention or alternatively it may be also controlled in the similar manner. In the fifteenth embodiment shown in FIG. 16, description is made on the case where, when any load detected by the load cell 48 is overload, the servo motor 18 is tripped by the controller 49; instead, the servo motor 18 may be driven at a rotational speed such that press velocity becomes zero.

As mentioned above, according to a power transmission for a mechanical press in accordance with the present invention, arranged between shaft sections of the power transmission shaft for transmitting rotational energy of the flywheel is a planetary gearing adapted to be driven by a servo motor. A power take-off gear is mounted on an output section of the planetary gearing so that rotation of the output section of the planetary gearing can be freely controlled by the servo motor and the rotational velocity of the power take-off gear can be varied. As a result, for example, when the slide is actuated through a slide drive, the action velocity of the slide can be freely controlled during a stroke of movement of the slide, which allows holding of stopping state at the lower dead point of the slide which in turn is effective for press working of aluminum material. Versatility is attained for press working of different kinds of materials. When a planetary gearing with a variable torque brake is arranged between shaft sections of a power transmission shaft, rotation of an output section of the planetary gearing can be freely controlled, so that rotational velocity of a power take-off gear can be varied and therefore the action velocity of a slide can be controlled just like the above case. With a planetary gearing being arranged between shaft sections of a power transmission shaft and adapted to be driven a the servo motor, arranged on an output section of the planetary gearing are a power take-off gear for transmission of driving force to a drive as well as a brake, so that rotation of the output section of the planetary gearing can be freely controlled by the servo motor and rotation of the output section may be stopped by the brake, which allows use of an on-off coupling such as gear coupling between the flywheel and power transmission shaft which coupling requires no consumable parts and which can be preliminarily connected. As a result, no mechanical shock will occur upon transmission of power; no exchange for consumables is required and therefore press working free from maintenance for consumables can be carried out and reduction in cost in press working can be attained. When a differential gear is used to return part of output of the planetary gearing and to an input side and is connected to a servo motor, any required braking force of the servo motor can be minimized. This is advantageous in that the servo motor may be of smaller sized. Provision of a load cell on a slide drive for detecting any overload makes it possible to trip a servo motor or to drive it at a required rotational velocity upon detection of any overload by the load cell so as to protect the machinery just like the prior art having hydraulic means for countermeasure to any overload. As a result, in comparison with the prior art having the hydraulic means for countermeasure to any overload, the present invention is simplified in structure and is facilitated in maintenance.

What is claimed is:

1. In a power transmission for a mechanical press wherein rotational energy stored in a flywheel through driving of a main motor is taken through a power transmission shaft by a power take-off gear and is transmitted to a drive, an improvement which comprises first and second shaft sections into which said power transmission shaft is divided and which are adjacent to said flywheel and said power take-off gear, respectively, a planetary gearing between the shaft sections, said power take-off gear being mounted on an output section of the planetary gearing, a differential gear for returning part of output taken by the power take-off gear to an input section of the planetary gearing and a servo motor connected to a part of the differential gear.

* * * * *

UNITED STATES PATENT AND TRADEMARK OFFICE
CERTIFICATE OF CORRECTION

PATENT NO.   : 5,453,060
DATED        : September 26, 1995
INVENTOR(S)  : Keiichiro HAYASHI It is certified that error appears in the above-indentified patent and that said Letters Patent is hereby corrected as shown below:

On the title page, Item [62], the Related U.S. Application Data should read:

--Division of Ser. No. 31,883, Mar. 16, 1993, Pat. No. 5,425,682.--

Signed and Sealed this

Twenty-sixth Day of December, 1995

*Attest:*

BRUCE LEHMAN

*Attesting Officer*    *Commissioner of Patents and Trademarks*